United States Patent [19]

Schermann

[11] Patent Number: 4,507,872

[45] Date of Patent: Apr. 2, 1985

[54] METHOD FOR MEASURING THE STATE OF DAMAGE OF AN AUTOMOBILE VEHICLE AND MEASURING APPARATUS FOR CARRYING OUT SAID METHOD

[75] Inventor: Maurice Schermann, Tigeaux, France

[73] Assignee: Garages Mutualistes Francais, France

[21] Appl. No.: 432,932

[22] PCT Filed: Jan. 20, 1982

[86] PCT No.: PCT/FR82/00011

§ 371 Date: Sep. 30, 1982

§ 102(e) Date: Sep. 30, 1982

[87] PCT Pub. No.: WO82/02943

PCT Pub. Date: Sep. 2, 1982

[30] Foreign Application Priority Data

Feb. 23, 1981 [FR] France .................................. 81 03515

[51] Int. Cl.³ .............................................. G01B 5/255

[52] U.S. Cl. .............................. 33/174 R; 33/174 P; 33/180 AT; 33/138

[58] Field of Search ....... 33/180 AT, 181 AT, 174 R, 33/288, 174 P, 138, 169 R

[56] References Cited

U.S. PATENT DOCUMENTS

| | | | |
|---|---|---|---|
| 2,341,176 | 2/1944 | Buehrig | 33/174 J |
| 3,531,868 | 10/1970 | Stevenson | 33/174 D |
| 4,302,883 | 12/1981 | MacGregor | 33/174 L X |

Primary Examiner—Harry N. Haroian
Attorney, Agent, or Firm—Charles W. Fallow; Martin P. Hoffman; Mitchell B. Wasson

[57] ABSTRACT

A method and apparatus for measuring automobile body damage are disclosed herein. The method comprises steps of measuring the height and depth of automobile body damages, and measurements so taken are assigned an accident code, which when compared with accident codes for previous accidents, enables one to estimate repair time and part requirements.

13 Claims, 8 Drawing Figures

METHOD FOR MEASURING THE STATE OF DAMAGE OF AN AUTOMOBILE VEHICLE AND MEASURING APPARATUS FOR CARRYING OUT SAID METHOD

DESCRIPTION

The present invention relates to a measuring method and an apparatus for carrying out said method for the purpose of determining the time required for repairing automobile vehicles, and it more particularly relates to the systematic estimation of the time for repairing a vehicle requiring either repairs to the mechanical part of the vehicle or repairs to the body, in particular after accidents, bearing in mind requirements of reconditioning certain parts and replacing other parts of the vehicle.

At the present time, the estimation of the cost of a repair is essentially based on scales of times which are the fruit of after sales services of the constructors based on replacement operations.

The operations for reconditioning, such as rectifying or smoothing out operations on body parts are not calculated. In order to establish a repair time at the present time one must add several times, the precision of which is poor, so that the determination of the overall time has a considerable arbitrary factor.

Another solution resides in awaiting the end of the reconditioning operations in order to know the time it took to carry out these operations.

Now, the ever-increasing interventions on automobile vehicles brought about by the increase in the number of vehicles in circulation and the number of accidents, makes it necessary to have available effective and precise means for determining the time required for a repair.

This necessity is particularly felt in the field of the repairing of bodies implying mostly the intervention of an insurance expert who usually only has a very short time to spend on each damaged vehicle and who consequently needs to use reliable, rapid and precise means of estimating the repair time.

Therefore, an object of the invention is to provide a measuring method for estimating the repair time of an automobile vehicle which calculates the repairs rapidly and precisely.

The invention therefore provides a method for measuring the state of damage to an automobile vehicle comprising employing means for ascertaining the deterioration as a function of the degree of the dent and the nature and number of the damaged parts, said method comprising employing an apparatus having a variable vertical and horizontal position; determining and reading with the aid of this apparatus on a first side of the vehicle, in respect of the lateral part, the height and degree of the dent due to the impact and its position relative to the median axis of the track; determining and reading by means of the same apparatus on a second side of the vehicle the same data so as to determine the differences; using the same apparatus for determining and reading by means of the apparatus the height and the degree of the dent due to the impact undergone by the front or rear part and its position relative to the median axis of the vehicle, so that, by comparison with the original dimensions of the same vehicle when new which were read off by means of said apparatus, the degree of the vector of deformation may be determined; assigning to these measurements repairing or replacing codes and combining them with damaged zone codes so as to determine an "accident code" which permits, by comparison with similar accidents previously repaired and calculated, performing the function of standards and recorded in a compilation of times, establishing the time required for reconditioning and listing the parts to be repaired or replaced.

Another object of the invention is to provide a measuring apparatus for carrying out the aforementioned method, said apparatus comprising a vertical frame and a support unit for said frame adapted to place it at a predetermined distance from at least one of the tires of the vehicle located in the vicinity of the impact to be assessed, and vertical and horizontal positioning means in the plane of said frame, in confronting relation to the position of the impact, for an element for measuring the degree of the dent in the body of the vehicle.

Further features of the invention will be apparent from the ensuing description.

In the drawings, given solely by way of example.

Figure 1:
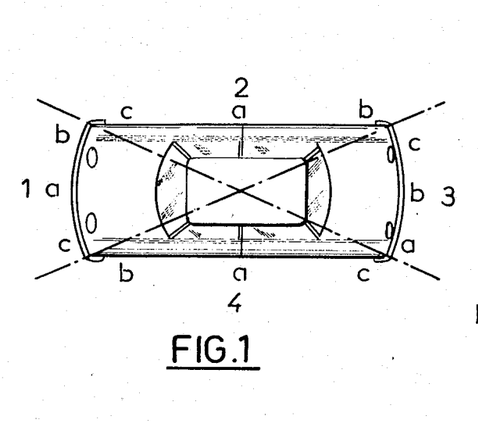
FIG. 1 is a diagrammatic plan view of an automobile vehicle subdivided into zones for the codification of the position of an impact on the body of the vehicle.

The vehicle shown diagrammatically in FIG. 1 is subdivided into four zones corresponding to the positions of impacts undergone by the vehicle:

zone 1 is the zone of the impacts at the front of the vehicle;

zone 2 corresponds to the right side of the vehicle;

zone 3 corresponds to the rear of the vehicle;

zone 4 corresponds to the left side.

The number of each of the aforementioned zones enters into the composition of an identification code number of the repair to be effected. This code is constituted as follows:

It comprises from left to right:

a zone of two positions and a zone of three positions of identification of the make and type of the vehicle;

a zone having one identification position of the zone of impact or of reconditioning;

a zone having four positions of parts to be replaced;

a zone having four positions of parts to be rectified or repaired;

a zone having three positions for determination of the degree of the dent;

a zone having one position relating to the type of the repair.

In the case of the assessment of the reconditioning of a body portion, the zone of the parts to be replaced and of the parts to be rectified is defined in the following way:

In order to indicate that the operation to be carried out requires only replacements of parts, zeros occupy all the positions of the zone of the parts to be rectified.

In order to indicate that the operation to be carried out requires only the rectification of parts, zeros occupy the positions of the zone of the parts to be replaced.

In order to indicate that the operation to be carried out requires both rectifications and replacements of parts, figures other than zeros occupy positions of the zone of the parts to be rectified and of the zone of the parts to be replaced.

In the case of the assessment of a reconditioning of a mechanical part, the zone of the parts to be replaced and of the parts to be repaired is defined in the manner indicated hereinbefore for the body, the data relating to the parts to be repaired being substituted for those relating to the parts to be rectified.

Each of the zones 1 to 4 of the body is in turn divided into 3 regions: a, b, c; a central region given the code O; two regions located on each side of the central region given the codes 1 and 2 respectively.

Figure 2:
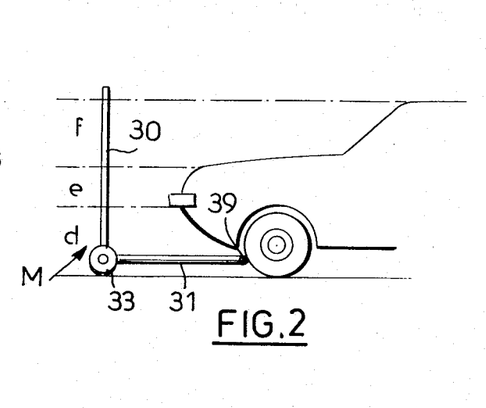
FIG. 2 is a partial elevational diagrammatic view of the vehicle of FIG. 1, subdivided at different levels for the codification of the position of impacts.

As shown in FIG. 2, the vehicle is moreover divided into three zones: d, e, f with respect to its height, codes 1, 2 and 3 being given to these three zones respectively.

This division in height is for example, the following:

the zone d concerns the elements located under the bumpers;

the zone e concerns the parts located between the bumpers and the lower parts of the window-glass areas;

the zone f concerns the parts located above the last-mentioned zones.

Thus dividing up the body of the vehicle permits the coding of the dent by filling in the aforementioned zone having three positions.

This coding is achieved in the following manner:

the first position from the right of the zone having three positions receives a figure indicating the degree of the dent produced by the impact. This degree is determined by the figures 1 to 9 of the measurement graduation of FIG. 3 or FIG. 4, as a function of the indications of a measuring apparatus M placed in contact with the body in the region of the impact undergone by the latter.

Figure 7:
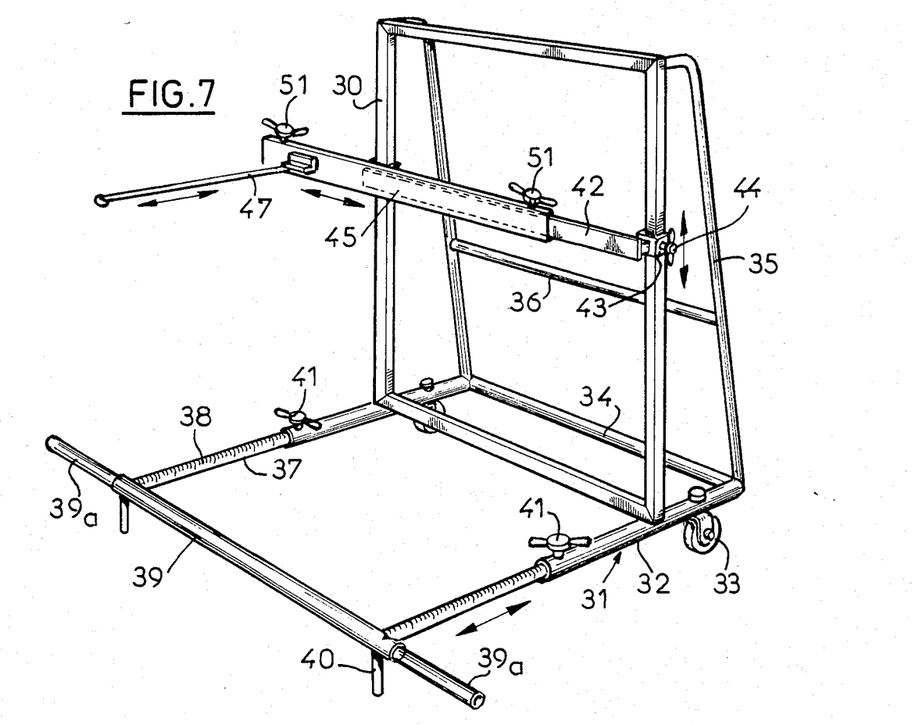
FIG. 7 is a perspective view of an apparatus employed for carrying out the method of the invention.
Figure 8:
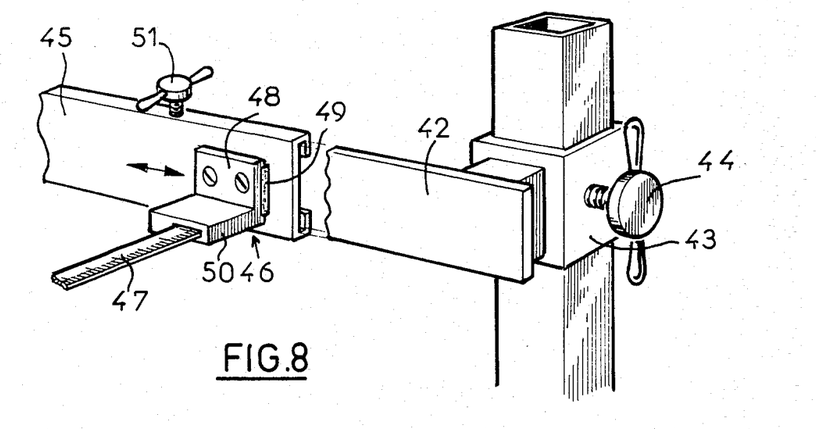
FIG. 8 is a perspective view of a detail of the apparatus of FIG. 7.

This apparatus M is shown in FIGS. 7 and 8 and will be described hereinafter.

The second position of the zone having three positions specifies the situation of the impact in one of the considered zones 1 to 4.

As indicated in FIG. 1, the figure placed in this second position has one of the values 0, 1 or 2 depending on whether the impact is located in the region a, b or c of the considered zone.

The third position of the zone having three positions is occupied by a figure of a value equal to 1, 2 or 3 depending on whether the impact is located at a height within the zones d, e or f.

The code thus constituted gives consequently complete information concerning the precise position of the impact and its intensity.

The zone having one position is intended to receive a nature code representing a reconditioning in the sheet metal workshop or in the paintshop.

The assignment of the codes to the various cases encountered when repairing automobile vehicles will now be described with reference to FIGS. 5 and 6.

Figure 5:
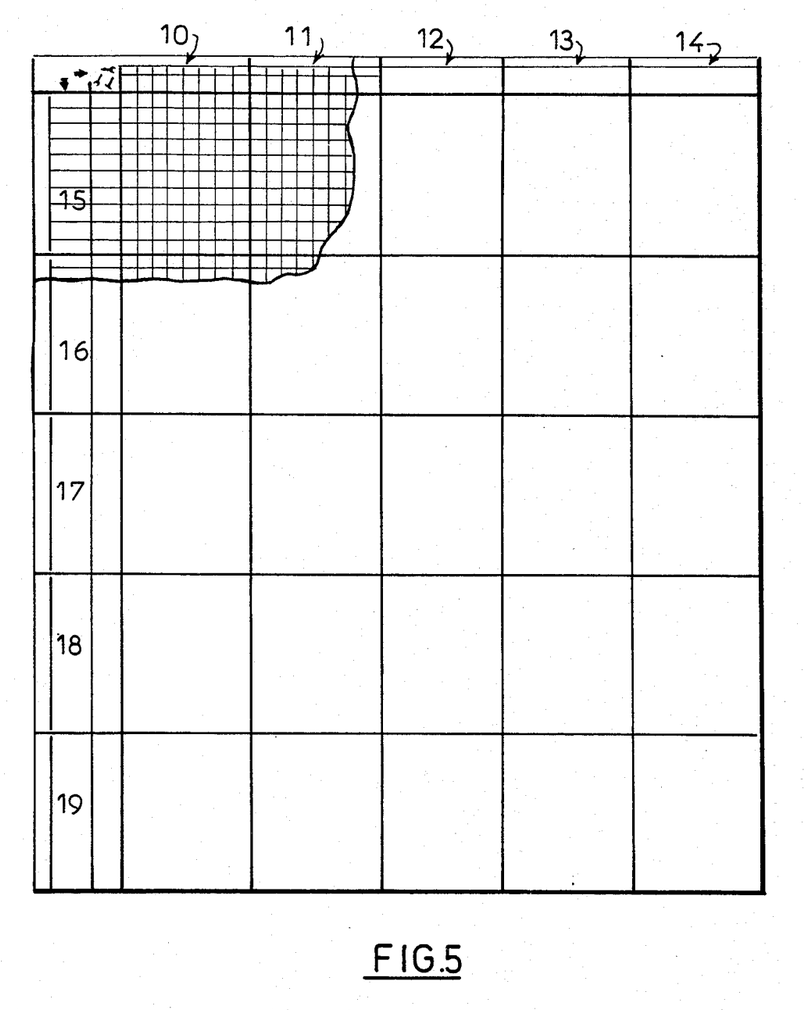
FIG. 5 is a general view of a cumulative sequential codification table of the constructional parts in a certain number of types of automobile vehicles.

The table shown in FIG. 5 is drawn up in accordance with the cumulative sequential method.

This table corresponds to the zone 1 of the vehicle shown in FIG. 1. It contains the designations of the parts located in this zone and belonging to automobile vehicles of all types.

It comprises, in starting from the left, a large column 10 of codes relating to outside elements of the body and four large columns 11, 12, 13, 14 grouping codes respectively relating to one, two, three and four interior elements of all the vehicles considered.

Each of the large columns 10 to 14 is subdivided into elementary columns each designating an element or a group of elements.

Figure 6:
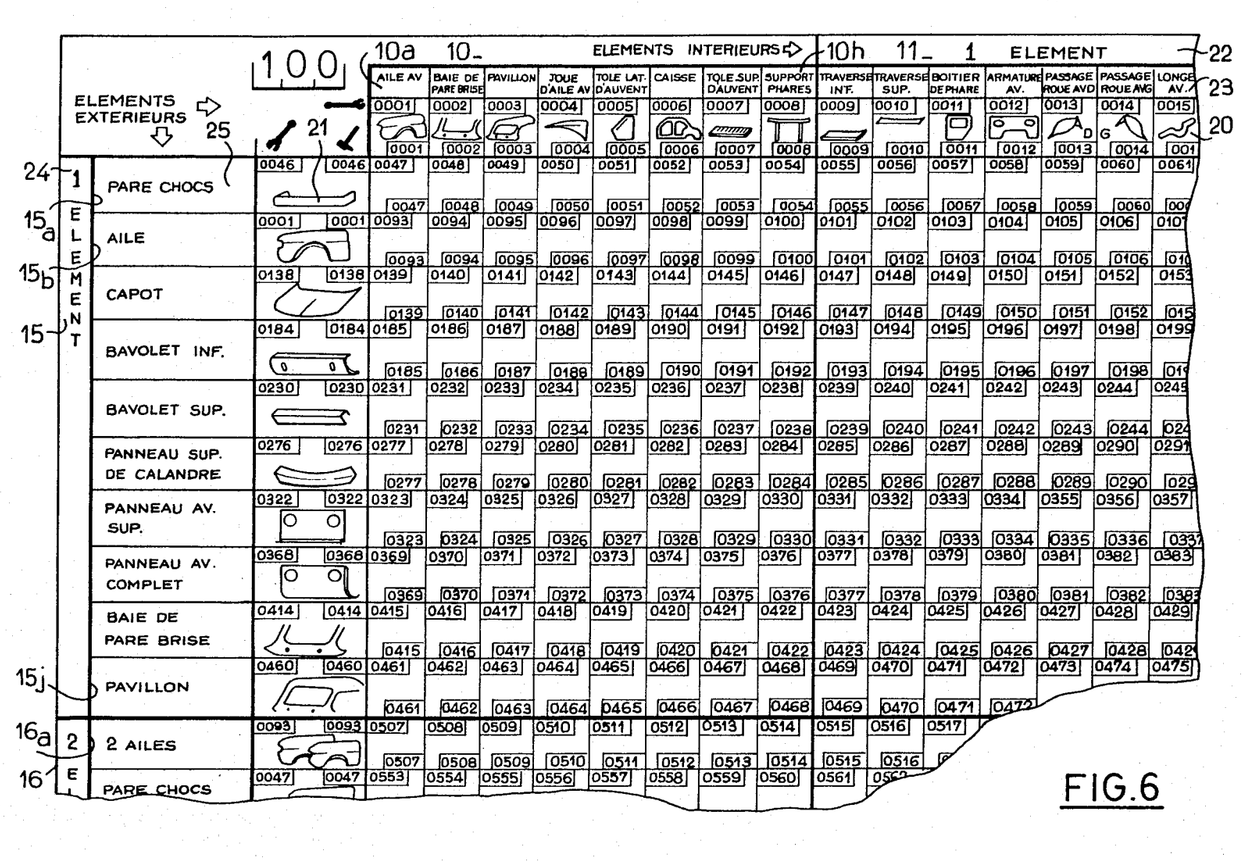
FIG. 6 is a view to an enlarged scale of a sector of the codification table of FIG. 5.

Thus, as shown in FIG. 6, the large column 10 which concerns exterior elements, is subdivided into elementary columns 10a to 10h each relating to codes given to the following parts.

| Elementary column | Element |
| --- | --- |
| 10a | front wing |
| 10b | windscreen surround |
| 10c | roof |
| 10d | front wing side |
| 10e | lateral cowl |
| 10f | body |
| 10g | upper cowl |
| 10h | headlight support |

The codes in each of these elementary columns respectively correspond to the various combinations of one of the parts indicated above with other parts whose codes are disposed in rows and which will be described hereinafter.

The other large columns 11 to 14 relating to interior elements or groups of elements are subdivided in the same way into elementary columns.

The table of FIG. 5 is moreover subdivided into five rows 15 to 19 relating to one, two, three, four and five exterior elements of the bodywork.

Each of these rows 15 to 19 is subdivided into lines relating to a particular element or group of elements.

For example, the row 15 is subdivided into lines 15a to 15j each corresponding to one of the following elements.

| Ligne | Element |
| --- | --- |
| 15a | bumpers |
| 15b | wing |
| 15c | bonnet |
| 15d | lower valance |
| 15e | upper valance |
| 15f | radiator shell upper panel |
| 15g | upper front panel |
| 15h | complete front panel |
| 15i | windscreen surround |
| 15j | roof |

In each of the boxes defined by the intersection of an elementary column and a line are placed two identical codes whose positions correspond respectively to a replacement operation and to a repair operation of the corresponding parts or group of parts.

The disposition of the codes is seen in FIG. 6 to which reference will now be made.

plane formed by the frame 30, is an elongated panel 45 constituted by a C-section member whose inwardly-extending edge flanges maintain the panel on the bar 42.

This panel is made from a magnetic material, for example iron.

It is adapted to position both horizontally and vertically a magnetic support 46 to which is connected a metal tape measure 47 for measuring the deformation vector.

The magnetic support 46 comprises a fixing element 48 which carries on one of its faces a magnet 49 adapted to be applied against the face of the panel 45, and a case 50 of the tape measure is fixed on the opposite face of the fixing element 48.

In the illustrated embodiment, the length of the panel 45 is equal to the width of the frame 30 so that, by sliding this panel on the flat bar 42 toward the left or toward the right, it is possible to place a part of this panel outside the limits of the frame 30 and thereby position the measuring element formed by the tape measure 47. On one side or the other of the apparatus when the position of the impact, e.g. a lateral impact, cannot be reached by disposing the measuring element between the uprights of the frame 30.

Such a situation could exist bearing in mind the fact that, in order to effect a correct assessment, the abutments 39 of the apparatus must always be applied against at least one wheel of the considered vehicle.

In order to immobilise the panel 45, the latter is provided with locking screws 51 disposed at its ends and adapted to cooperate with the bar 42 when tightened.

There will now be given an example of a coding achieved according to the method and by means of the apparatus of the invention.

It will be assumed that the impact occurred in the zone 1, i.e. in front of the vehicle shown in FIG. 1.

Figure 3:
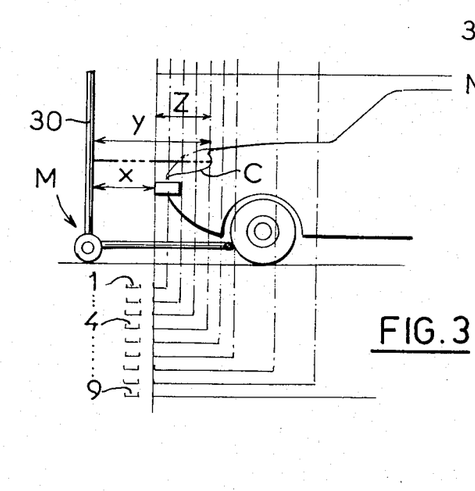
FIG. 3 is a diagrammatic view corresponding to FIG. 2 but in which there is added a graduation of the measurement of the deformations which may be undergone by the vehicle receiving an impact at the front.

The apparatus M of FIG. 7 is then placed in the position shown in FIG. 3 in such manner that the abutment bars 39 are applied against the front wheels of the vehicle.

It is clear that the distance between the front end of the bonnet of the vehicle and the front edge of its front wheels depends on the make and type of the vehicle.

For a given adjustment of the position of the graduated bars 37 with respect to the side-members 32, this distance may be related to the distance x between the vertical frame 30 of the measuring apparatus and the end of the bonnet.

It is easy to draw up tables of values of the aforementioned distance x and values of the corresponding distances of the rear or of the side of the vehicle relative to this vertical frame 30 of the apparatus, for example for all the types of vehicles of a given make.

After having disposed the measuring apparatus M in the manner indicated hereinbefore, the flat bar 42 is adjusted in height on the uprights of the vertical frame.

In the present example, and with reference to FIGS. 2 and 3, the impact occurred in the zone e to which the numerical code 2 is assigned.

The support 48, 49 of the metal tape measure 47 is then placed in front of the impact zone c of the vehicle in such manner that the magnet 49 causes the support to adhere to the elongated panel 45, which permits a more precise determination of the horizontal position of the impact. In the present example, it will be assumed that the impact occurred in the region c of the zone 1. The code 2 is therefore assigned thereto.

The tape measure 47 is then unwound until its end touches the bottom of the deformation of the body of the vehicle in the zone of the impact c so as to obtain the distance y between the plane of the frame 30 of the apparatus and the bottom of the impact zone.

The difference $Z = y - x$ gives the depth of the impact to which is assigned a numerical code between 1 and 9.

In the example of FIG. 3, this code is 4.

The zone of determination of the extent of the dent having three positions of the assessment code will therefore contain the number

/224/.

Then the number of parts of the body to be replaced or rectified is determined.

In the example of FIG. 3, it can be assumed that the left front wing must be replaced while the bonnet may be rectified.

Reference is then made to the table of FIG. 6 in which it can be seen that the code assigned to a wing is 0001 while that assigned to the bonnet is 0138. The number 0001 is then placed in the zone having four divisions of the parts to be replaced and the number 0138 is placed in the zone having four positions of the parts to be rectified or repaired.

The assessment code then becomes:

/0001 /0138 /224/

It also includes in the present example the figure 1 indicating the zone of impact and becomes:

/1/ 0001 /0138 /224/

It is completed on the left side by a code having two figures which indicates the make and a code having three figures indicating the type of the vehicle and, on the right side, by a code having one figure indicating the nature of the repair. The following arbitrary values can be given respectively to these various codes: 37, 510 and 8.

This therefore gives the following complete code:

/37 /510 /1/ 0001 /0138 /224 /8/

The code obtained in this way is processed in the manner indicated hereinbefore and gives an assessment of the time required to repair the vehicle.

In the foregoing, it was mentioned that the times for repairing and the corresponding incident codes may be recorded on microfiches or time schedules. These collections of items of information, which may moreover assume the most diverse forms including those of a permanent memory of an electronic calculating unit, may group items of information relating to all of the vehicles of one or more makes or to one or more vehicles of a single make.

The magnitude and number of these collections must be adapted to the size of the firm using them.

Although in the embodiment shown in FIG. 7, the measuring apparatus M comprises as the means for horizontally and vertically positioning the metal tape measure 47, a flat bar 42 adjustable in height on the In the present example, the codes are assigned in succession from left to right starting on the first line. They are decimal codes which can be easily read by the user.

The upper boxes of all the elementary columns of the table and the left boxes of all the lines of the table also form respectively an additional line 20 and an additional column 21 which, while they are an integral part of the table, also include picture representations of the corresponding elements and groups of elements of said table.

The table shown in FIGS. 5 and 6 further comprises marginal lines and columns 22, 23, 24, 25 in which are shown indications relating to the number of elements and to the nature of these elements or groups of elements.

The table diagrammatically shown in FIG. 5 comprises forty-five elementary columns which corresponds to a theoretical periodicity of forty-five code numbers per line.

However, it will be observed that this periodicity is not respected when two identical elements or groups of elements are on an elementary column and on a line.

This is, for example the case of the front wings of a vehicle.

Indeed, it could occur that an impact affects one wing or both wings.

Thus the same code 0001 is assigned to the wing shown in the elementary column 10a and to that located in line 15b.

When both the front wings are damaged, these wings form a group of two elements to be rectified or replaced. Consequently, a particular code must be assigned to this group.

The code assigned to the intersection of the elementary column 10a with the line 15b is 0093.

It is therefore this code which is assigned to the grouping of two wings found on line 16a of the row 16.

Such a procedure of the assignment of codes to groups of elements formed from elements which have already received code numbers pertaining thereto, therefore implies a derogation, whenever this is necessary, of the aforementioned rule of periodicity.

Corresponding tables for the zones 2 or 4 and 3 of the representation of the FIG. 1 are drawn up in accordance with the same procedure as the table of FIGS. 5 and 6.

In the present example, the tables such as those of FIGS. 5 and 6 are of the universal type designed for a large number of vehicles.

However, it will be understood that it is possible to establish:

series of tables particular to a make of car;

series of tables for a type of car, or series of tables for a model in a type of car.

Moreover, similar tables are also established for the mechanical repairing operations.

Associated with the set of tables established in the aforementioned manner is also a time schedule in which are entered the durations of the repairs corresponding to the various incident codes formed from the various items of information of the place and intensity of the impact and of the nature of the damaged parts.

These durations were established experimentally from data collected from workshop records recording repairs carried out on vehicles identical to those for which an assessment is to be furnished.

For each case a mean time is established which results from the addition of a certain number of times required for carrying out a given repair and the division of this sum by this number. The three shortest times and the three longest times are also noted, which gives a mean indication taking into account:

an overall mean time for a car in a good general state;

a shorter mean time for a car having a low mileage and well-serviced and whose age is between 1 and 2 years;

a longer mean time for a car having a high mileage and whose age exceeds five years.

The schedule of times thus drawn up may be put on microfiches.

These microfiches of course carry all the incident codes established in the manner indicated hereinbefore and the corresponding reconditioning times.

They also carry the list of the parts which must be possibly be replaced.

Apart from these essential items of information, the microfiche may also mention:

the price of all the parts, the price of the reconditioning with painting, the total price of the reconditioning operation with the fungibles included.

These items of information are brought up to date twice a year. Access to all these items of information carried by the microfiches is by means of a display screen controlled by a keyboard.

The universality of the process of the invention resides in the fact that the nomenclature of the parts is established by means of a numbering of the parts which is the same for a given part irrespective of the make of the vehicle to which it pertains.

Taking again the example of a wing, the latter still carries the code number 0001.

This facilitates classification for establishing statistics. Moreover, the user can become rapidly familiar with the numbers of the parts.

The establishment of the dent code is ensured by means of the apparatus shown in FIGS. 7 and 8 which will now be described.

This apparatus comprises a vertical frame 30 fixed on a trolley 31 comprising two tubular side-members 32 each carrying a wheel 33 and cross-member 34 which interconnects the two side-members at one end thereof.

The vertical frame 30 is held on the trolley by means of a reinforcing framework 35 which includes, midway of its height, a cross-bar 36 for handling the apparatus.

Figure 4:
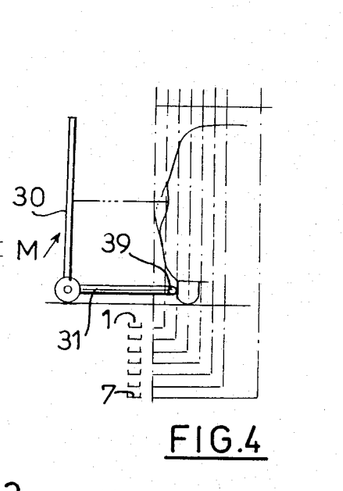
FIG. 4 is a partial side elevational view carrying graduations of measurements of deformations which may be undergone by a vehicle receiving a lateral impact.

Slidably mounted in the ends of the side-members 32 opposed to the cross-member 34 are bars 37 carrying graduations 38 along their length and connected to a transverse bar 39 which is adapted to bear against a tire of a vehicle in the manner shown in FIGS. 2–4. A foot 40 is fixed in the region of the junction of each of the bars 37 with the corresponding bar 39.

Each of the side-members 32 has, at the end thereof remote from the wheel 33, means 41 for locking the corresponding bar 37 against movement in translation. These means are advantageously formed by a screw provided with a winged head for facilitating its actuation.

Adjustably mounted in height on the uprights of the vertical frame 30 is a flat transverse bar 42 which carries at its ends supports 43 which are slidably mounted on the uprights of the frame 30 and are also provided with means for locking them against movement in translation by winged screws 44.

Slidably mounted on the flat bar 42 constituting a slideway, disposed on its supports 43 in front of the uprights of the frame 30 and on which is slidably mounted an elongated panel 45 adapted to receive the support 48 including the magnet 49 for the tape measure 47, it will be understood that other embodiments of these positioning means may be envisaged.

For example, there may be disposed on the frame a metal panel which occupies the whole of its area and is capable of sliding a given distance on each side of the uprights of the frame 30.

In this case, it would be sufficient merely to place the magnet 49 of the support in front of the position of the impact without previously adjusting positioning means.

I claim:

1. A method for measuring the damaged state of an automobile vehicle comprising employing means for ascertaining the deterioration of the vehicle as a function of the degree of the dent produced by impact and the nature and number of the damaged parts, said method comprising employing an apparatus having a variable vertical and horizontal position; determining and reading with the aid of said apparatus on a first side of the vehicle in respect of the lateral part thereof, measurements of data including the height and the degree of the dent due to the impact and the position of the dent relative to a median axis of the track of the vehicle; determining and reading with the aid of said apparatus on a second side of the vehicle the same data so as to determine the differences between the two data; using said apparatus for determining and reading with the aid of said apparatus, measurements including the height and the degree of the dent due to the impact undergone by the front or rear part of the vehicle and the position of the impact relative to a median axis of the vehicle so as to determine, by comparison with the original measurements of the same vehicle when new which were read off by means of said apparatus, the degee of a vector of deformation; assigning to said measurements repairing or replacement codes and combining said codes with damage zone codes so as to determine an "accident code" which, by comparison with similar accidents which were previously repaired and calculated and perform the function of standards and are recorded in a compilation of times, permits establishing the time required for reconditioning and permits listing the parts to be repaired or replaced, said "accident code" comprising a succession of zones in which are inscribed numbers having at least one figure advantageously identifying the make and the type of the vehicle and revealing the region of the impact, the identification of the parts to be repaired or replaced and the assessment of the situation and of the seriousness of the impact ascertained by said apparatus.

2. A measuring method according to claim 1, comprising, for the purpose of assigning to the parts to be replaced or repaired codes corresponding to the operations they must be subjected to, providing in said accident code a zone pertaining to the parts to be replaced and a zone pertaining to the parts to be repaired, and making said code correspond to each part or each group of parts independently of the fact that the part or group of parts is to be repaired or replaced, and placing said code in that zone of the accident code which corresponds to the operation to be effected.

3. A measuring method according to claim 1 or 2, comprising, for the purpose of determining the time required for repairing portions of the body of a vehicle having undergone an impact, codifying the parts by inventorying the parts of at least one vehicle from the exterior toward the interior of the vehicle by analogy with the progression of the effects of the denting of the body by an impact.

4. A measuring method according to claim 2, wherein the codes are disposed in at least one table formed by columns and rows which are in turn respectively subdivided into elementary columns and lines each of which relates to an element or a group of at least two elements, and a code which is at the intersection of a line and an elementary column is assigned to the group of elements constituted by the sum of the element or elements of the corresponding elementary column and of the element or elements of the corresponding line.

5. A measuring method according to claim 3, wherein the codes are disposed in at least one table formed by columns and rows which are in turn respectively subdivided into elementary columns and lines each of which relates to an element or a group of at least two elements, and a code which is at the intersection of a line and an elementary column is assigned to the group of elements constituted by the sum of the element or elements of the corresponding elementary column and of the element or elements of the corresponding line.

6. A measuring method according to claim 4, wherein, when the same element or group of elements is both in an elementary column and in a line of the table, the same code is assigned to said same element or to said same group of elements in the two positions thereof.

7. A measuring method according to claim 5, wherein, when the same element or group of elements is both in an elementary column and in a line of the table, the same code is assigned to said same element or to said same group of elements in the two positions thereof.

8. A measuring method according to claim 4, 5, 6, or 7, comprising dividing a vehicle into a plurality of zones, assigning to each of said zones a code which is a constituent of constituents of said accident code, and constituting tables grouping all of the elements contained in each zone of the vehicle.

9. A measuring method according to claim 8, wherein the codes identifying the damaged zone of the body of the vehicle are established by assigning a first position of said code to the degree of the dent produced by the impact, assigning a second position of said code to the horizontal position of said impact and assigning a third position of said code to the position in height of said impact.

10. A measuring method according to claim 9, wherein the degree of the dent, the horizontal position and the position in height of the impact are determined by means of a measuring apparatus which is applied against a reference surface of the vehicle.

11. An apparatus for measuring automobile body dents, comprising
- a vertical frame, substantially contained in a plane,
- a support unit attached to said frame for placing the frame at a predetermined distance from at least one of the tires of the vehicle located in the vicinity of a dent to be assessed, and
- means for vertically and horizontally positioning in said plane of said frame, in front of the dent, an element for measuring the depth of the dent,
- said means comprising a horizontal bar vertically slidable on said frame and an elongated panel horizontally slidable on said bar and having immobilizing means,
- said measuring element comprising a tape measure rigidly supported on said elongated panel.

12. A measuring apparatus according to claim 11, wherein said frame has uprights, said positioning means comprise a flat bar, and supports which are adjustable in height and slidably mounted on the uprights of the frame support opposite end portions of the flat bar, an elongated metal panel of a magnetic material being slidably mounted on said flat bar and being provided with immobilizing means, said element for measuring the degree of the dent comprising a metal tape measure having a case rigid with a support fixed to a magnet applied against said elongated panel in front of the place of the impact on the vehicle.

13. A measuring apparatus according to claim 11 or 12, wherein the support unit for the vertical frame comprises a trolley having two hollow side-members, bars which carry graduations and are adjustably slidably mounted in side-members, means for immobilizing the bars in the side-members, and a transverse abutment bar which is connected to ends of said tube bars for applying against a reference surface of the vehicle.

* * * * *